May 30, 1933.  A. ROSNER  1,911,470

FLEXIBLE CABLE

Filed March 9, 1929

INVENTOR
Adolph Rosner
BY H. O. Clayton
ATTORNEY

Patented May 30, 1933

1,911,470

UNITED STATES PATENT OFFICE

ADOLPH ROSNER, OF SOUTH BEND, INDIANA, ASSIGNOR TO BENDIX BRAKE COMPANY, OF SOUTH BEND, INDIANA, A CORPORATION OF ILLINOIS

FLEXIBLE CABLE

Application filed March 9, 1929. Serial No. 345,629.

This invention relates to flexible power transmission devices and more particularly to improvements in the casing or conduit of such devices.

An object of the invention is to provide a conduit of the "Bowden" type wherein the flexible power transmission element is housed by a flexible conduit having a definite slack between ends attached to relatively movable supports for said ends and which is of substantially unvarying length despite its change of shape due to flexing and despite its subjection to compressive strains under the action of the tensioned power transmission element passing therethrough.

In the attainment of the above object, there is provided a flexible conduit comprising a plurality of cup-shaped disk stampings somewhat loosely threaded on the flexible cable between end pieces which are secured to relatively movable supports, the whole being preferably covered by a flexible grease-retaining tube secured at its ends to said end pieces. According to an important feature of my invention, the stampings are arranged in pairs with their concave sides facing each other, thus providing a unit housing a suitable lubricant.

A predetermined spacing of the disks is also effected, which spacing permits the conduit to flex as more completely described hereafter.

Various other features of my invention including desirable particular details of construction and combination of parts will become apparent from the following detailed description of one embodiment of my invention shown in the accompanying drawing, in which.

Figure 1:
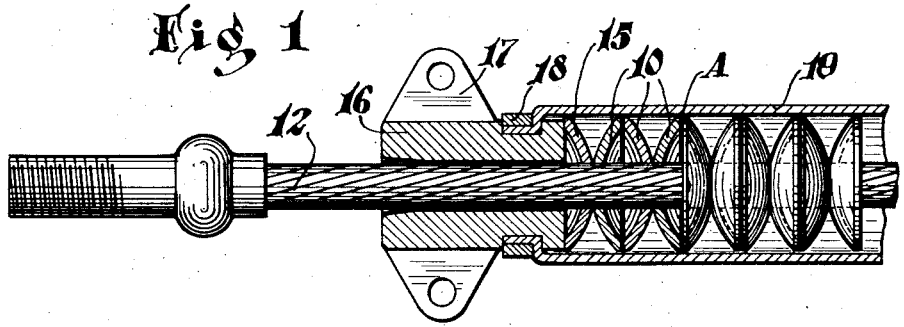
Figure 1 is a partial plan view of the power transmission device disclosing the details of my novel conduit in longitudinal section.
Figure 2:
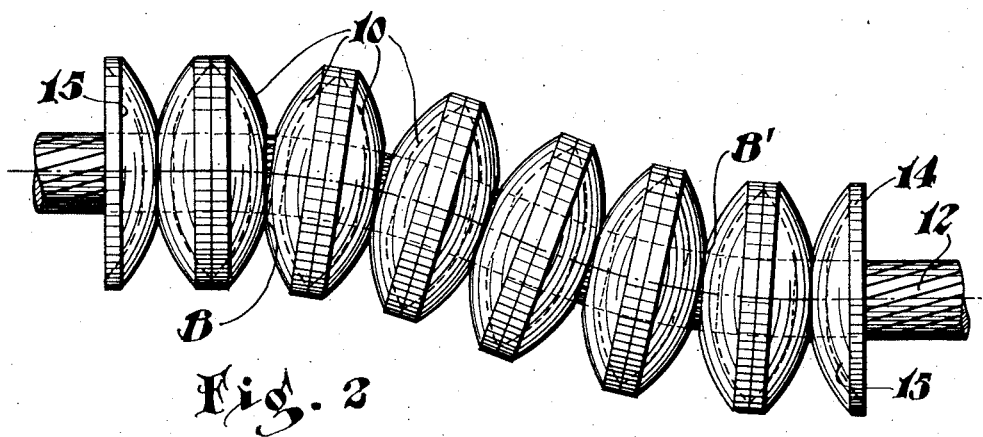
Figure 2 is a fragmentary view showing an enlargement of a portion of the disk elements constituting the body of the conduit and disclosing the relative positions assumed by the elements with flexing of the conduit.

The preferred embodiment of my invention disclosed in detail in Figures 1 and 2 of the drawing comprises a conduit made up of a plurality of cup-shaped disk-like stampings 10 somewhat loosely threaded that is slightly longitudinally spaced on a flexible power transmission cable 12. The stampings are preferably arranged in pairs with the stampings of each pair having their concave sides facing one another to provide a reservoir for lubricant. The two-part units thus formed are generally ellipsoidal in shape. The rim of each stamping is preferably flattened at 14 as shown in Figure 2, the flats of each stamping contacting. At each end of the conduit a single outwardly facing disk 15 abuts a stationary end piece or fitting 16 which is fixedly secured to a bracket or equivalent support member 17, which member may be secured respectively to the chassis frame and front brake support of an automobile. A flexible grease-retaining covering such as a heavy woven fabric jacket 19 may enclose the circular conduit body members and is preferably secured, as by a ferrule 18, to each end fitting 16. A convenient subassembly unit is thus provided consisting of the end pieces 16, jacket 19 and stampings and which unit is readily sleeved over the flexible cable.

According to an important feature of the invention, a predetermined flexibility of the conduit is effected by the degree of spacing between the several disks and which spacing is indicated at "A" in Figure 1.

With bending of the conduit the slack determined by the sum of the spaces A is consumed and the units assume the angular relation indicated in Figure 2, one unit contacting its adjacent unit at the point B at the left of said figure. Inasmuch as the units are then in contact throughout the length of the conduit, further flexing is impossible without springing the several disks to change their degree of dish. The degree of flexing of the conduit is thus predetermined by the degree of slack or initial space between the plurality of disks. Obviously the arc of curvature indicated in Figure 3 may be reversed as indicated at the right in said figure, in which event the point of contact between the substantially incompressible disks shifts to the point B'.

Figure 4:
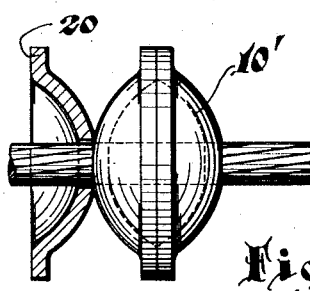
Figure 4 is a detail view showing a modified form of conduit unit.

A modified form of unit is disclosed in Figure 4, wherein the cup-shaped stampings 10 may each be provided with a flat peripheral flange 20 bent outwardly from the curve of the stamping. The flanged stampings are arranged in face to face contact as disclosed, providing two part hollow grease-retaining units.

Figure 3:
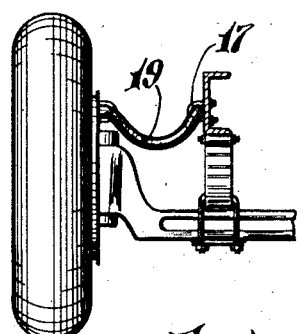
Figure 3 is a diagrammatic view showing the complete conduit in use as part of the control mechanism for an automobile brake, the end fittings of the conduit being secured respectively to the chassis and brake support plate of the swiveled front wheel.

Relative movement of the wheel and chassis of Figure 3 effects the aforementioned flexing of the conduit and with tensioning of the power transmitting cable during braking, the contacting units illustrated in Figure 2 effectually resist compression to which they are subjected by the cable.

The above described flexible power transmission mechanism may find adaptation in various arts and is obviously not limited in its use to a brake control for automotive vehicles and while but one illustrative embodiment of my invention has been described in detail, it is not my intention to limit the scope of the invention to that particular embodiment, or otherwise than by the terms of the appended claims.

I claim:

1. Power transmission mechanism comprising a flexible conduit characterized by end fittings separated by spaced cup-shaped body members arranged in pairs with the members of each pair facing in opposite directions.

2. Power transmission mechanism comprising a flexible conduit including end fittings separated by curved disk members facing alternately in opposite directions.

3. A flexible conduit comprising end fittings; cup shaped elements separating said end fittings, facing alternately in opposite directions; and a tubular casing secured to said end fittings and covering said elements.

4. A flexible conduit comprising end fittings spaced by cup-shaped elements arranged in pairs with their convex surfaces oppositely disposed.

5. A flexible conduit comprising end fittings spaced by cup-shaped elements arranged in pairs, with their convex surfaces oppositely disposed, the elements of each pair having contacting flat portions constituting the joint between the elements of each pair.

6. A flexible conduit comprising compression-resisting ellipsoidally shaped two-piece hollow units housed by a tubular jacket.

7. A flexible conduit comprising two-part ellipsoidally shaped units disconnectedly engaging each other, and means comprising a tight fitting tubular jacket of predetermined internal diameter for restraining relative movement between the parts of said units.

8. In a power transmission mechanism, a flexible conduit having its ends spaced by a tubular jacket housing a plurality of disk members, having oppositely disposed convex faces.

9. In a brake control, a flexible conduit having its ends spaced by a tubular jacket housing a plurality of cup-shaped disk members having convex faces arranged in oppositely disposed relation, which members are spaced a predetermined amount when the conduit is in its unflexed state, said conduit being substantially non-compressible in its flexed state.

10. A brake control comprising a flexible conduit characterized by cup-shaped disk body elements, each having an outwardly pressed flat peripheral flange.

11. In a flexible conduit, a plurality of concavo-convex disk-shaped stampings arranged in pairs with their convex surfaces in oppositely disposed relation, said stampings provided with circular shaped openings.

12. A conduit characterized by end fittings separated by concavo-convex stampings having flat rims, said stampings arranged in pairs with their flat portions contacting one another.

13. A conduit characterized by end fittings separated by concavo-convex stampings having flat rims, said stampings arranged in pairs with their flat portions contacting one another, in combination with a flexible tubular grease-retaining jacket housing said stampings.

14. A flexible conduit comprising a pair of end fittings, and a plurality of intermediate members having convex faces arranged facing in opposite directions and positioned to separate said end fittings.

In testimony whereof, I have hereunto signed my name.

ADOLPH ROSNER.